(12) United States Patent
Halford

(10) Patent No.: US 10,166,701 B2
(45) Date of Patent: Jan. 1, 2019

(54) MOULD TOOL

(71) Applicant: SURFACE GENERATION LIMITED, Rutland (GB)

(72) Inventor: Ben Halford, Rutland (GB)

(73) Assignee: SURFACE GENERATION LIMITED, Rutland (GB)

(*) Notice: Subject to any disclaimer, the term of this patent is extended or adjusted under 35 U.S.C. 154(b) by 812 days.

(21) Appl. No.: 14/418,937

(22) PCT Filed: Aug. 5, 2013

(86) PCT No.: PCT/GB2013/052081
§ 371 (c)(1),
(2) Date: Jan. 31, 2015

(87) PCT Pub. No.: WO2014/023942
PCT Pub. Date: Feb. 13, 2014

(65) Prior Publication Data
US 2015/0190947 A1    Jul. 9, 2015

(30) Foreign Application Priority Data

Aug. 10, 2012  (GB) .................. 1214336.8

(51) Int. Cl.
*B29C 33/04*  (2006.01)
*B29C 35/00*  (2006.01)
*B29C 45/73*  (2006.01)

(52) U.S. Cl.
CPC ............ *B29C 35/002* (2013.01); *B29C 33/04* (2013.01); *B29C 45/7312* (2013.01); *B29K 2995/0013* (2013.01)

(58) Field of Classification Search
CPC .... B29C 35/002; B29C 33/04; B29C 45/7312
USPC .......................................................... 425/143
See application file for complete search history.

(56) References Cited

U.S. PATENT DOCUMENTS 4,621,995 A    11/1986  Wersosky
2002/0162940 A1    11/2002  Frul et al.

FOREIGN PATENT DOCUMENTS

| DE | 8716697 U1 | 2/1988 |
|---|---|---|
| DE | 10236522 A1 | 2/2004 |
| JP | S61-192528 A | 8/1986 |
| JP | H09-141715 A | 6/1997 |
| JP | 2004-202566 A | 7/2004 |
| JP | 2005-329555 A | 12/2005 |
| JP | 2010-017761 A | 1/2010 |
| JP | 2011-031258 A | 2/2011 |
| JP | 2011-235341 A | 11/2011 |

OTHER PUBLICATIONS

International Search Report and Written Opinion dated Mar. 17, 2014 in related PCT application PCT/GB2013/052081.
(Continued)

*Primary Examiner* — Christina A Johnson
*Assistant Examiner* — Xue H Liu
(74) *Attorney, Agent, or Firm* — Young Law Firm, P.C.

(57) ABSTRACT

A mold tool component (10) has a mold face (34), a temperature control face (36) opposite the mold face (34), a cavity (42) adjacent the temperature control face (36), and at least one rib (16) extending from the temperature control face (36) into the cavity (42), which rib (16) has a concave profile in cross section.

14 Claims, 7 Drawing Sheets

(56) References Cited

OTHER PUBLICATIONS

Patents Act 1977: Amendment to Search Report dated Nov. 30, 2012 in related GB Application No. GB1214336.8.
JPO Office Action dated May 23, 2017 in JP 2015-525938, with English translation.

MOULD TOOL

BACKGROUND

The present application is concerned with a mould tool component. Specifically, the present application is concerned with a mould tool component for use in a heated mould, more specifically, the type of mould which comprises a plurality of fluid cavities for selective heating of various zones across the mould.

Heated mould tools are known from the present applicant's previous application, WO2011/048365. That application discloses a mould tool having a number of pins which contain cavities for the introduction of a heated or cooled fluid in order to control the surface temperature of the mould tool during a moulding operation. This is useful for selectively controlling the material properties during, for example, moulding and out-of-autoclave curing of a composite workpiece.

The applicants subsequent application WO 2013/021195, discloses a multi-layered mould tool in which an upper mould tool component is provided having a number of fluid cavities. The upper mould tool component comprises a number of tessellated zones each having a mould face for moulding of the component as well as a temperature control face opposite to the mould face adjacent a cavity into which heating/cooling fluid is introduced. Each cavity has a side wall in order to contain the fluid therein. The heating/cooling fluid then heats/cools the temperature control face and therefore the mould face. The heating/cooling fluid is introduced via a conduit from a lower layer where control and heating electronics are stored. Exhaust fluid from the upper tool is exhausted back down through an intermediate layer.

SUMMARY

It is desirable to be able to reduce the amount of material used in the upper mould tool component. The less thermal mass this component has, (i.e., the smaller it is) the more responsive it will be to the addition (and removal) of heat. Conversely, the larger the mould tool is, and the more material used in its construction, the slower it will be to react to heating or cooling fluid. For the purposes of the present invention, it is desirable to produce a "thermally agile" tool, i.e., one with low thermal mass. Furthermore, it is desirable to improve the conduction of heat between the centre of the temperature control face and mould face and the outer extremities of the zone in question. A known method of heating such a tool uses impingement of a fluid jet onto the temperature control face which can result in temperature gradients forming between the centre of the heated face in the cavity, (where the jet impinges), and the outer extremities of the heated or cooled surface.

It is an object of the present invention to provide an improved mould tool component. According to a first aspect of the invention there is provided a mould tool comprising:
 a thermal transmission face;
 a temperature control face opposite the thermal transmission face; and, a plurality of sidewalls extending from the temperature control face defining a plurality of individual fluid chambers adjacent the temperature control face;
 a fluid based temperature control apparatus associated with at least some of the plurality of fluid chambers, each temperature control apparatus configured to produce a fluid jet directed to an impingement region on the temperature control face;
 in which at least some of the plurality of fluid chambers define at least one rib extending into the respective fluid chamber from the temperature control face into the cavity, and, extending from the impingement region on the temperature control face towards the sidewall,
 in which each rib has a concave profile in a cross sectional plane extending normal to the temperature control face.

For the avoidance of doubt, the "thermal transmission face" is the face used to transfer thermal energy between the temperature control face and the workpiece—it may define the mould form (i.e., it may constitute a "mould face") or it may be in contact with a further mould component defining the mould face. Advantageously, the provision of a concave rib within the fluid chamber provides several advantages. First of all, it provides a stiffening reinforcement for the upper part of the mould tool defining the thermal transmission face and the temperature control face. The heated part of the tool can therefore be made thinner, and more thermally agile. Because the rib is concave in cross-section, it is also low in mass and therefore will not significantly contribute to the thermal mass of the component.

Furthermore, the concave nature of the ribs allows free airflow within the chamber whilst increasing the surface area of the component. As such, heat can be conducted more effectively throughout the chamber. In particular, the ribs can be used as a heat conduction path, transmitting heat to the extremities of the chamber.

Still further, the fact that the ribs extend outwardly allows them to act as "guide vanes" for the flow of air, promoting its passage along the most direct route to the sidewalls.

It is envisaged that should the advantages of enhanced airflow be desired in isolation (i.e. without any of the conductive properties of the ribs), they may be insulated from the temperature control face by an air gap or insulating material layer.

The concave ribs increase the surface area to volume ratio of the component, increasing thermal energy conduction to and from the fluid. The ribs can also be used for load reaction, particularly for moulding loads (i.e., compressive loads on the mould face and therefore the thermal transmission face).

Preferably three or more ribs are provided extending radially at different angles from the first region towards the sidewall.

Preferably the ribs have an arched profile in cross section, more preferably a curved, arched profile in cross section.

The arched profile of the ribs may extend through 90 degrees from the first region to the sidewall. By this we mean the ribs describe a 90 degree arch. In this configuration, two opposite ribs extending radially from the impingement region for a single 180 degree arch with the impingement region located at the position on the arch closest to the temperature control face. This may also be described as a "single 180 degree arch" configuration.

The arched profile of the ribs may extend through 180 degrees from the first region to the sidewall. Therefore two ribs extending radially oppositely from the impingement region result in a "double arch".

Preferably the plurality of ribs are distributed symmetrically about at least one plane normal to the temperature control face and intersecting the first region.

Preferably the sidewall terminates in a planar seal face at an opposite end to the temperature control face, and in which the ribs are contained within the chamber defined by the temperature control face, side wall and the plane of the planar seal face.

The ribs may terminate at the plane of the planar seal face.

The tool may comprise a mould tool support arranged to support the mould tool component during moulding, in which a load path from the mould face, through the thermal transmission face to the support component is through the rib.

The rib may contact the mould tool support.

The temperature control apparatus comprises a fluid outlet in contact with a support region of the ribs. Preferably the ribs are equally spaced around the fluid outlet.

The ribs may be constructed from a different material to the rest of the material of the temperature control face. Preferably the ribs are constructed from a material with a higher heat transfer coefficient than the material of the temperature control face to enhance thermal conduction and avoid an impingement "hot spot".

According to a second aspect of the invention there is provided a method of manufacture of a moulded component comprising the steps of:

providing a mould tool according to the first aspect, supplying a fluid into the chamber to heat or cool the temperature control face and thereby the thermal transmission face, moulding a component using the mould tool.

BRIEF DESCRIPTION OF THE DRAWINGS

An example mould tool component in accordance with the present invention will now be described with reference to the accompanying figures, in which:

FIG. 2b is a close-up view of an area of the mould tool component of FIG. 2a;

DETAILED DESCRIPTION

Figure 1A:
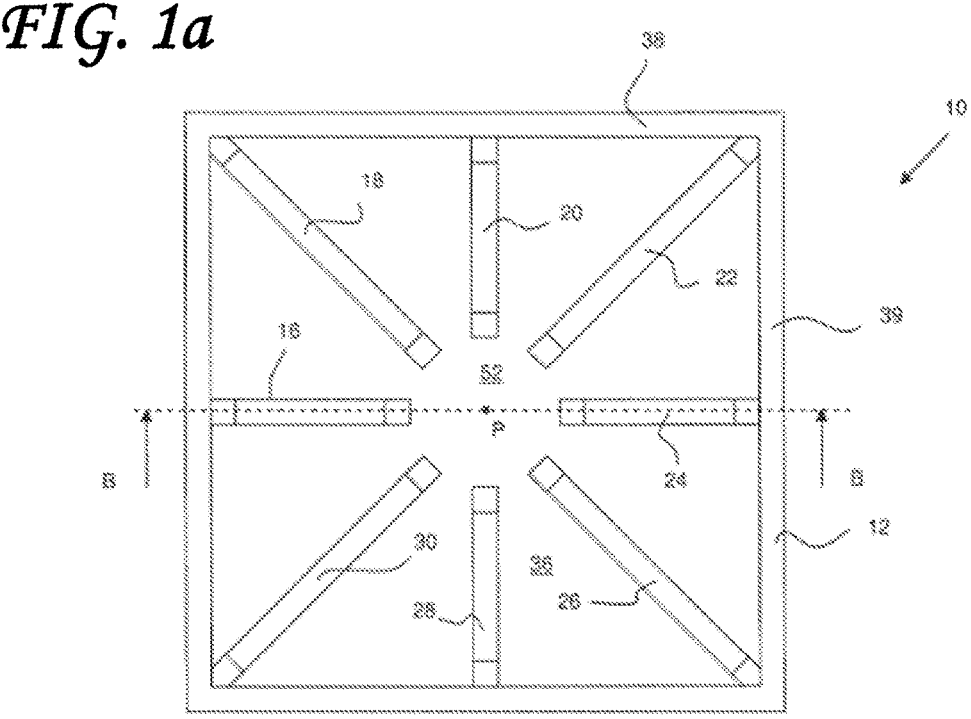
FIG. 1a is a view of a part of a first mould tool component in accordance with the present invention.
Figure 1B:
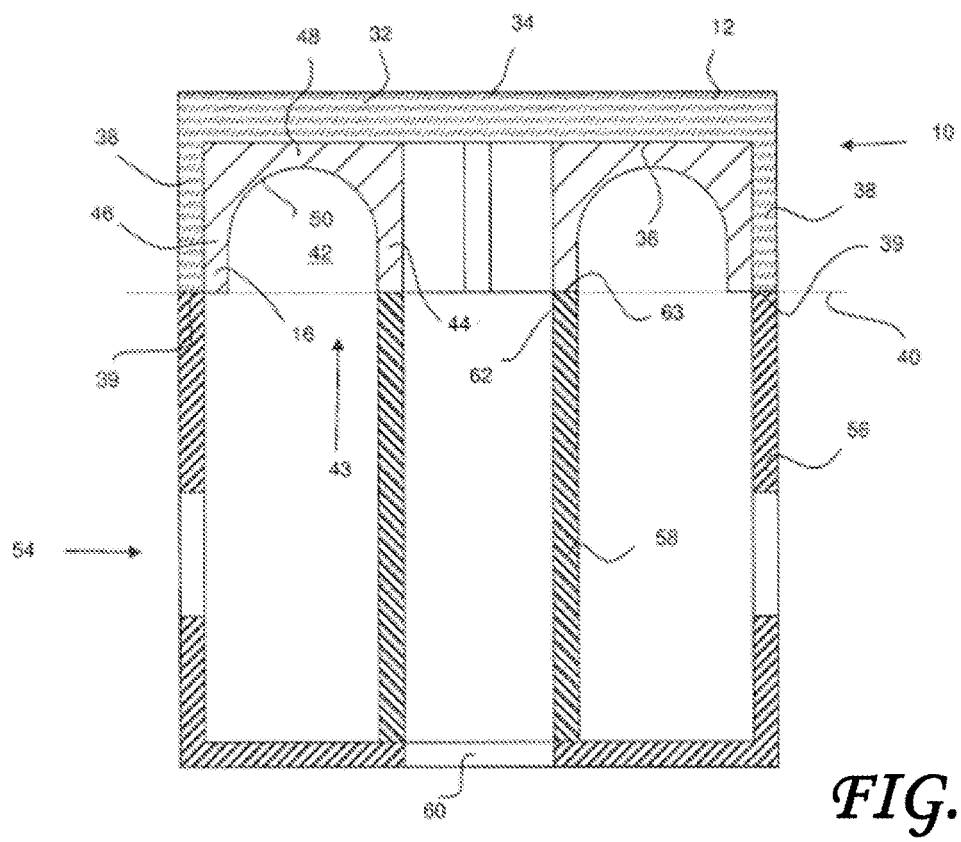
FIG. 1b is a section view of part of the mould tool component of FIG. 1a, along line B-B.

Turning to FIGS. 1a and 1b, there is provided a mould tool component 10 according to the present invention. The mould tool component 10 comprises a mould member 12 and first to eighth ribs 16, 18, 20, 22, 24, 26, 28 and 30.

The mould member 12 comprises an upper plate-like section 32 which defines on its upper surface a thermal transmission face which is also a mould face 34, and on its lower surface a temperature control, or heated face 36. The face 36 will be referred to as the "heated" face but may be heated or cooled. The mould face 34 defines a profile for contact with a workpiece. The plate-like section 32 is generally square in profile as shown in FIG. 1a. The tool component 10 is made up of several tessellating plate-like sections 32. At the periphery of the plate-like section 32 an endless side wall 38 extends. The side wall 38 projects normal to the heated face 36 and extends to a sealing face 39 on a plane 40 generally parallel to the heated face 36. As such, an open cavity 42 is formed bounded by the heated face 36, the inside surface of the side walls 38 and the plane 40. It will be noted that the cavity 42 has an open face 43 within the sealing face 39.

Turning to each of the ribs 16, 18, 20, 22, 24, 26, 28, 30, they are similar in form and, as such, only the first rib 16 will be described in detail here. The rib 16 is substantially planar and extends normal to the heated face 36. The rib 16 is concave in cross-section as shown in FIG. 1b. The rib 16 has a first vertical portion 44 and a second vertical portion 46, which are joined by an arched portion 48. The arched portion 48 defines on its lower surface a 180 degree circle segment concave curve 50 which joins the two vertical portions 44 and 46. On its outer face, the rib 16 abuts the side wall 38 and the heated face 36 of the mould member 12. As shown in FIG. 1a, each of the eight ribs extends from a central region 52 of the heated face 36 and each of the ribs is oriented at an equal angle about a central point P of the plate-like member 12.

Turning to FIG. 1b in particular, a support component 54 is shown which sits beneath the mould tool component 10. The support component 54 acts as a load reaction structure for moulding forces applied to the face 34 and also comprises a conduit for heating a cooling fluid as will be described below.

The support component 54 comprises an outer wall 56 which is a continuation of the side wall 38 of the mould tool component 10. The support component comprises an internal fluid conduit 58 which passes through the vertical length of the support component 54. The conduit 58 has an inlet 60 arranged for receiving a heated or cooled fluid which then passes up the conduit 58 to an outlet 62. The outlet 62 has an annular face 63 upon which the interior ends of the various ribs 16 to 30 rest. As such, the fluid passing from the inlet 60 to the outlet 62 passes towards the central region 52 where it impinges on the heated face 36. Due to the presence of the ribs the fluid is guided outwardly to the outer periphery of the heated surface 36 and to the side walls 38. Advantageously, the ribs encourage radial flow which results in impingement onto the side wall 38, assisting heat transfer at the periphery.

Some of the moulding forces are transmitted through the ribs into the conduit 58. It will also be noted that the presence of the arches in each of the ribs allows fluid to flow around the circumference of the mould tool component cavity 42.

During heating or cooling the fluid flow will typically impinge onto the central region 52 of the heated face 36. The ribs will aid conduction of this thermal energy to the extremity of the component 10 by increasing the surface area to volume ratio of the tool component 10. As shown in FIGS. 1a and 1b, the ribs are individual components. In this instance, for example, the mould member 12 may be constructed from a stiff material for moulding purposes, such as aluminium or steel, the ribs can be constructed from a less stiff material with high thermal conductivity, such as copper. This will enhance the conduction of heat away from the central region 52.

As a variation on the above embodiment, the ribs can be made integral with the mould member 12. Turning to FIGS.

2a and 2b, such an integrated design is shown. A mould tool component 110 has an integrated mould member 112 which defines a plurality of cavities 142.

Figure 2A:
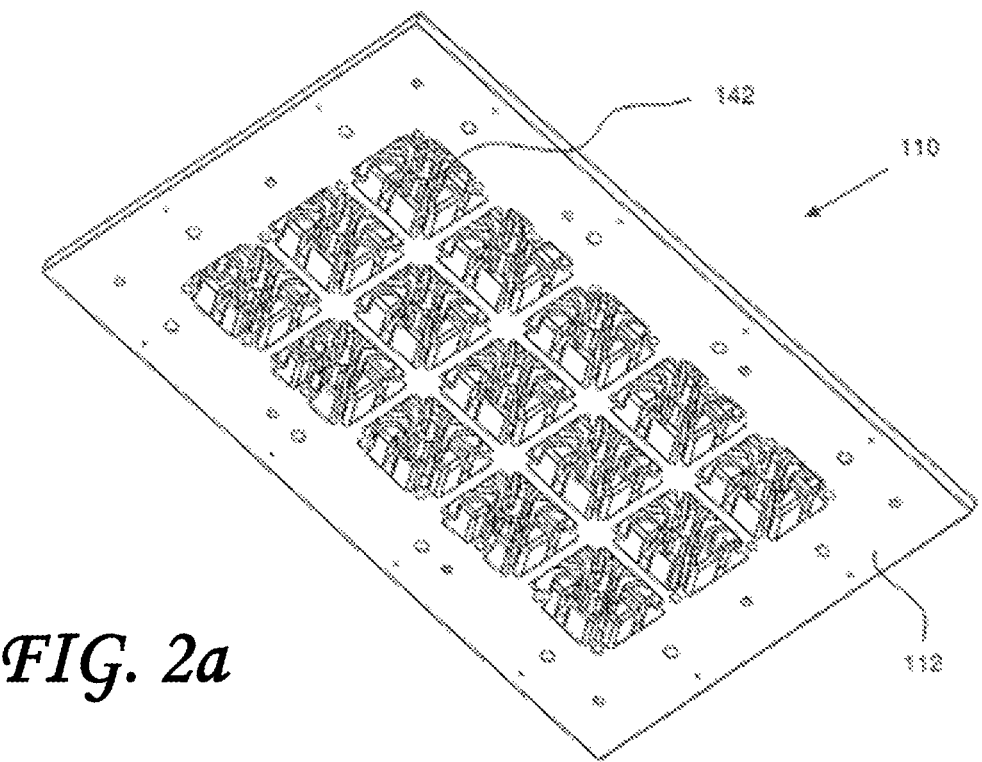
FIG. 2a is a perspective view of a second mould component tool in accordance with the present invention.
Figure 2B:
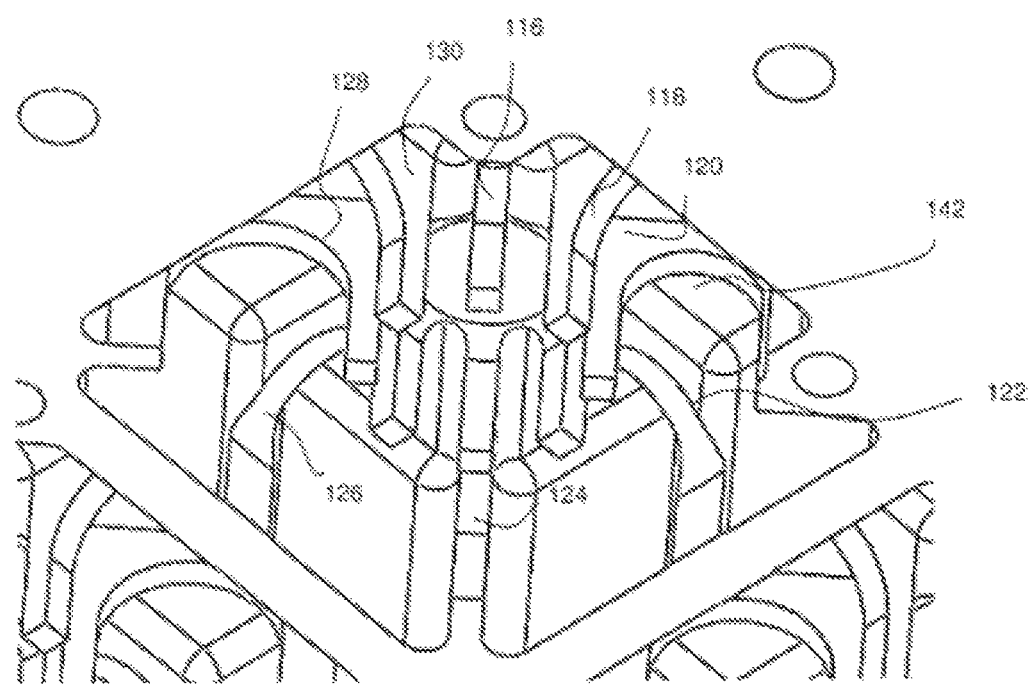

Turning to FIG. 2b, each of the cavities 142 contains eight ribs 116 to 130. As such, each of the cavities 142 contains a similar structure to the embodiment shown in FIGS. 1a and 1b.

Figure 2C:
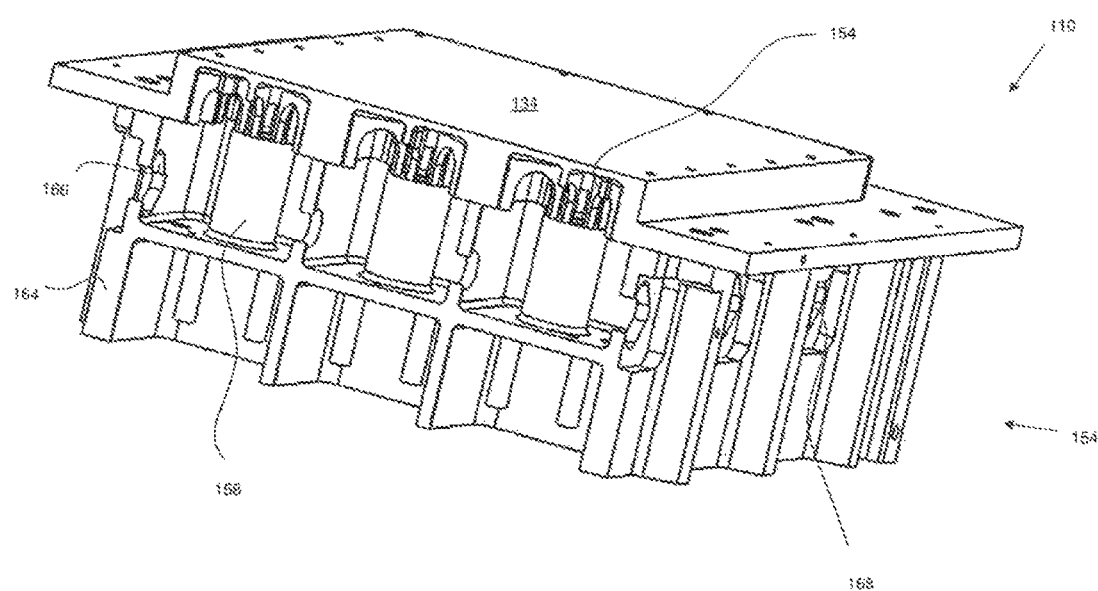
FIG. 2c is a perspective view of the mould tool component of FIGS. 2a and 2b assembled with further mould tool components.

Turning to FIG. 2c, the mould tool component 110 is shown installed on a support component 154. Again, as shown in FIG. 1b, the support component 154 comprises various fluid conduits 58 which project up to the inner region of the ribs 116 to 130.

The support member 154 comprises a lower section 164 which houses all of the necessary electrical and control equipment for the fluid heating/cooling and a middle exhaust section 166 into which all of the exhaust flow from the cavities 154 is directed and exhausted through ports 168. A mould face 134 of the mould tool component 110 is visible in FIG. 2c.

Figure 3A:
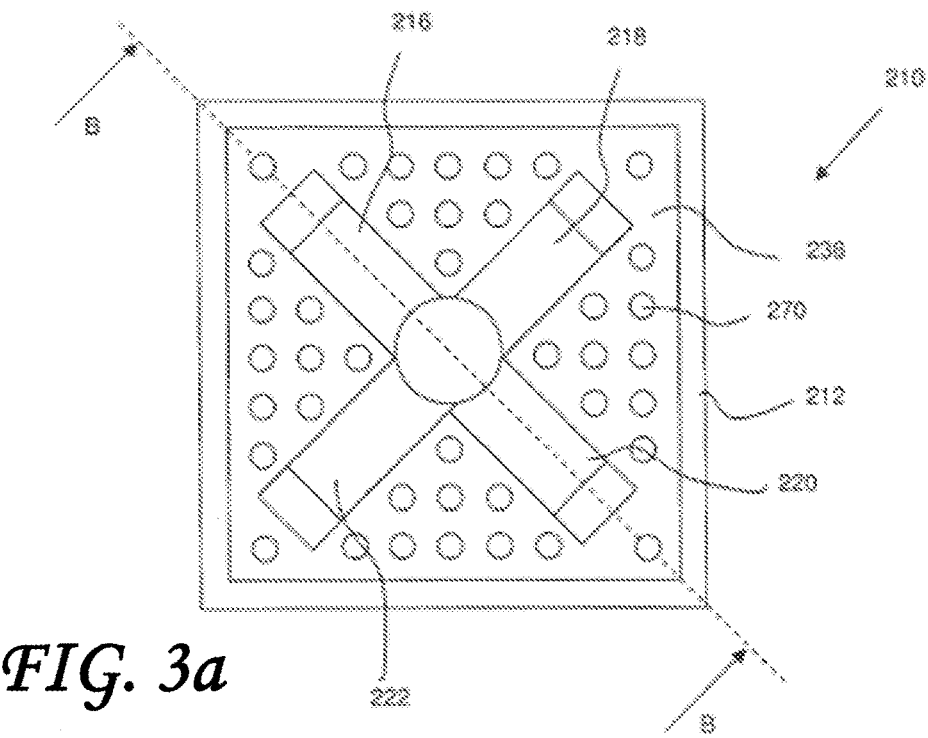
FIG. 3a is a view of a part of a third mould tool component in accordance with the present invention.
Figure 3B:
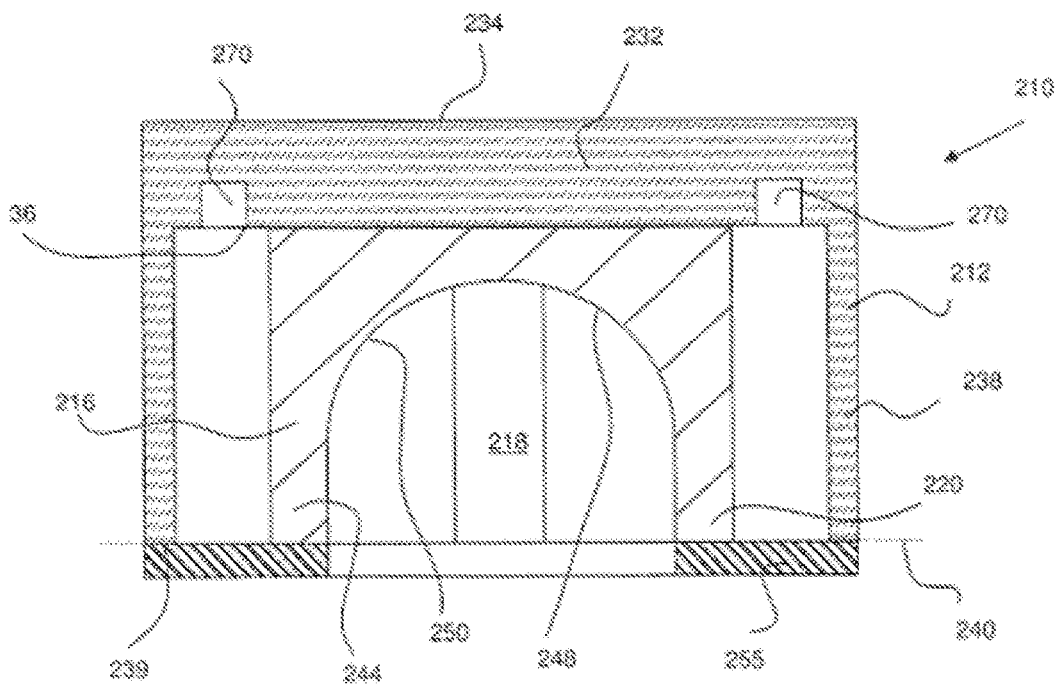
FIG. 3b is a section view through FIG. 3a along line B-B.

As discussed above, one embodiment of the invention has a number of ribs, each of which define 180 degree arches. Turning to FIGS. 3a and 3b, an alternative mould tool component 210 is shown. The mould tool component 210 comprises a mould member 212 having four ribs 216, 218, 220 and 222. The mould member 212 comprises a plate-like section 232 defining a mould face 234 and a heated face 236. The heated face 236 is bounded by a side wall 238 which like the mould tool component 10, defines an open cavity 242. The side wall 238 extends down to a seal face 239 on a notional sealing plane 240.

Each of the ribs 216, 218, 220, 222 define a 90 degree arch. As shown in the section of FIG. 3b, the ribs 216 and 220 form one 180 degree arch together. The rib 216 has a vertical portion 244 which extends upwardly into a 90 degree circle segment 250. The rib 220 extends up in the opposite direction. The ribs 216, 220 meet at a central region 252 at the apex of the 180 degree arch. The heated face 236 comprises a plurality of bores 270 which act to increase the general surface area of the heated face 236 and thus increase conduction with the fluid in the cavity 242.

A support member 254 is also shown, which again supports the side wall 238 in addition to the ends of the arches of the ribs 216, 220. The support member 255 will also have a fluid conduit extending therewith (not shown) in order to provide heated or cooled fluid into the cavity 242.

Figures 4, 5:
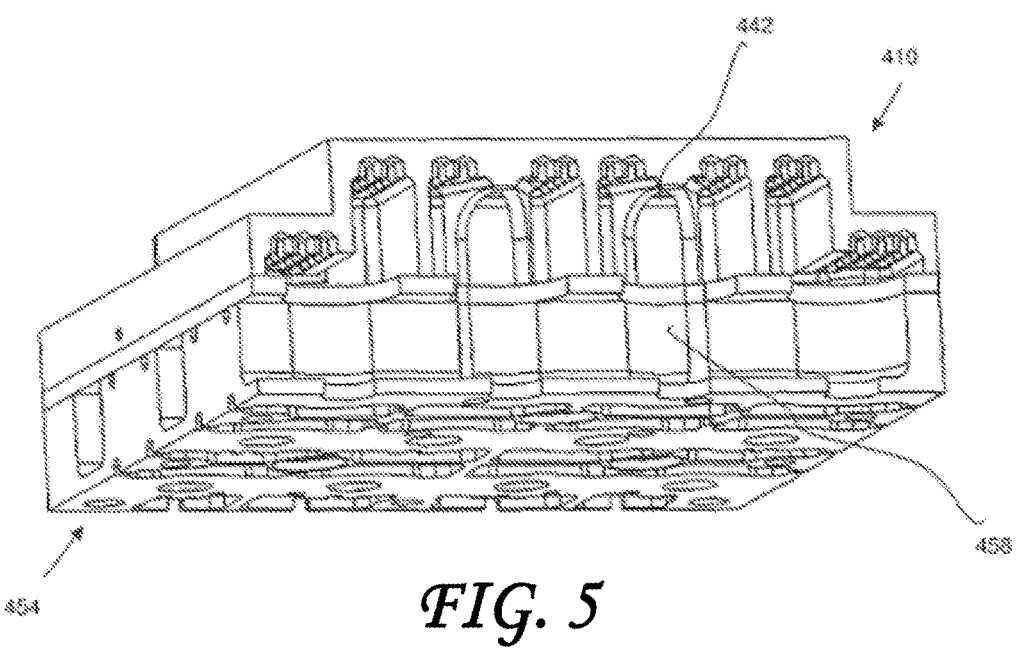
FIG. 4 is a perspective view of a fourth mould tool component in accordance with the present invention.
FIG. 5 is a perspective cut-away view of a fifth mould tool component in accordance with the present invention assembled with other mould tool components.

Turning to FIG. 4, a perspective view of an example of a mould tool component similar to that shown in FIGS. 3a and 3b is shown. The mould tool component 310 comprises a plurality of cavities 342, each of which have four ribs 316, 318, 320 and 322. As can be seen, a number of cavities 342 are provided in order to provide a continuously variably heated mould tool. Turning to FIG. 5, a further similar mould tool component 410 is shown being attached to a support component 454. As can be seen, fluid conduits 458 inject fluid into the cavities 442.

Figure 6A:
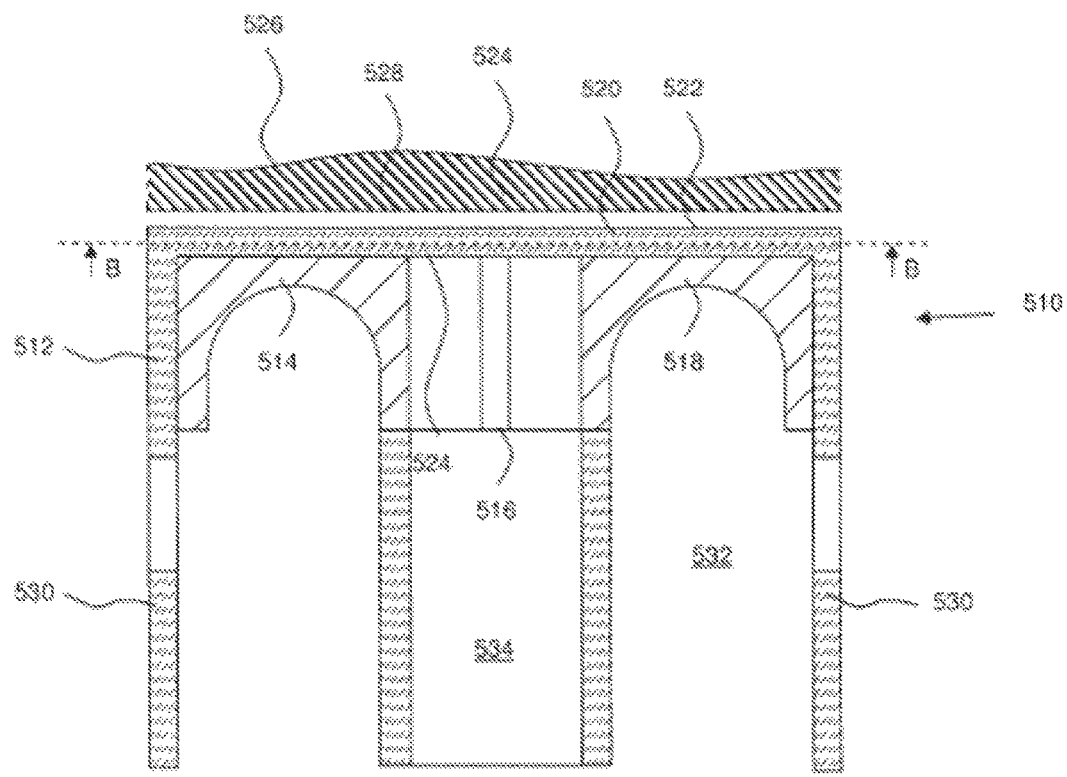
FIG. 6a is a section view of a part of a sixth mould tool component in accordance with the present invention.
Figure 6B:
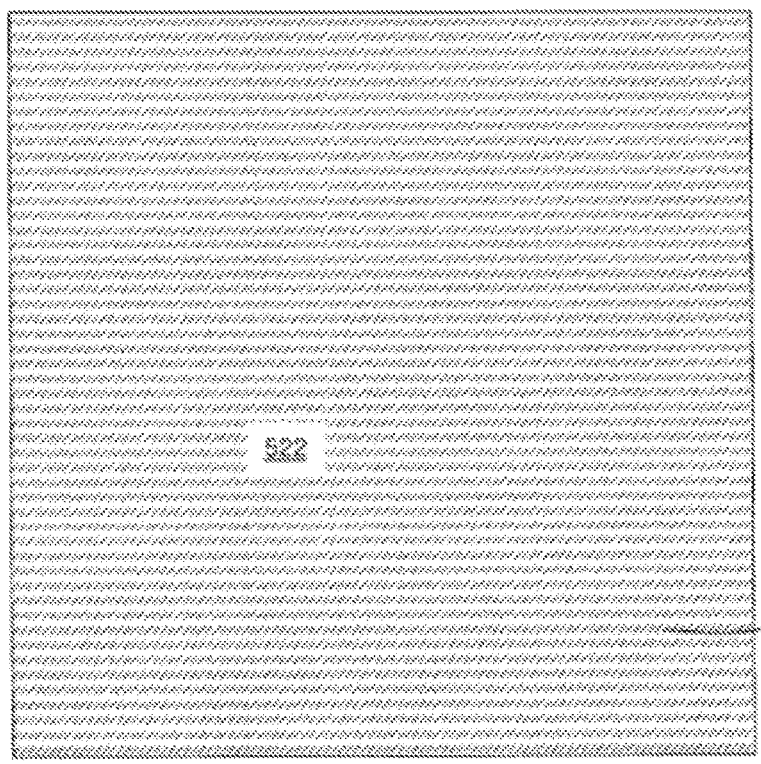
FIG. 6b is a section view through the tool of FIG. 6a along line B-B.

Turning to FIGS. 6a and 6b, a variation of the mould tool component 10 is shown, and is labelled 510. The mould tool component 510 comprises a support component 512, which in turn comprises arches 514, 516, 518. The support component 512 comprises an upper plate-like section 520 which defines on its upper surface a thermal transmission face 522, and on its lower surface a temperature control, or heated face 524. The face 524 will be referred to as the "heated" face but may be heated or cooled. The thermal transmission face 522 is substantially flat, planar and uninterrupted, as shown in FIG. 6b.

A mould profile component 524 is provided defining a profiled mould face 526 for contact with, and forming of, a workpiece. Opposite the mould face 526 there is provided a contact face 528. The contact face 528 is in thermal contact with the thermal transmission face 522 in use. The mould component is a continuous, unitary piece which is in contact with several "zones" of the support component 512 (NB FIG. 6 shows the support component 512 and mould component 524 exploded for clarity, but during normal operation they would be in thermal conductive contact). Each "zone" of the support component 512 is generally square in profile. The tool component 510 is made up of several tessellating zones. At the periphery of each zone an endless side wall 530 extends. The side wall 530 project normal to the heated face 524. As such, an open cavity 532 is formed bounded by the heated face 524 and the inside surface of the side walls 530.

As in the embodiment of FIGS. 1a and 1b, the support component 512 acts as a load reaction structure for moulding forces applied to the mould face 526 and also comprises a conduit 534 for heating a cooling fluid. As a variation on the above embodiment, the ribs can be made integral with the support member 512.

Figure 7:
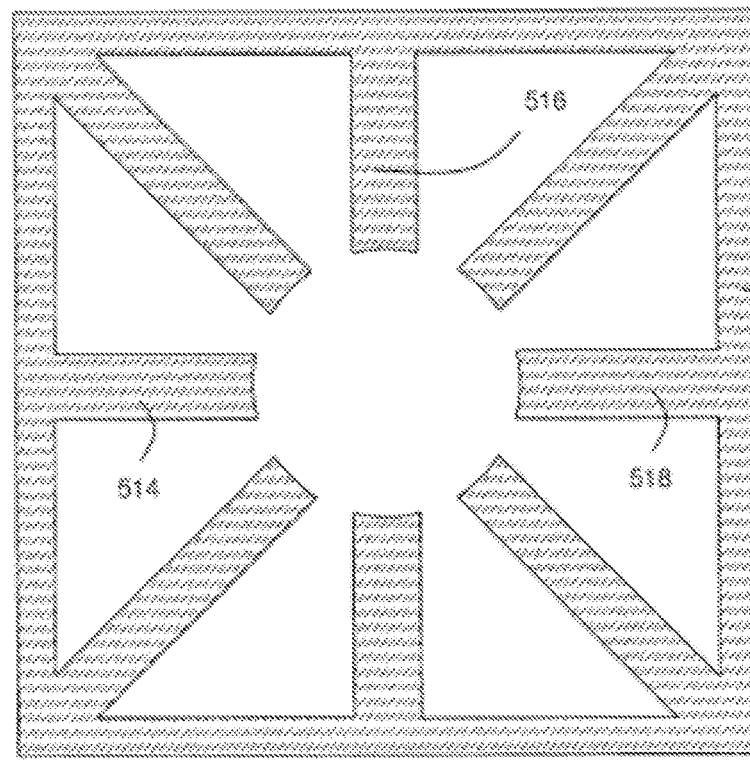
FIG. 7 is a section view of a seventh mould tool component in accordance with the present invention.

Turning to FIG. 7, a variation on the section of FIG. 6b is shown in which the plate-like section 520 is open around the arches 514, 516, 518 such that the heating cooling fluid makes direct contact with the mould profile component 524. This improves the thermal agility of the tool 510. Variations fall within the scope of the present invention. For example, the ribs need not be arches or circle segments. They may be constructed from other suitable concave formations, e.g., an arch made up of several straight segments, a v-shape, a w-shape or any similar concave arrangement.

The invention claimed is:

1. A mould tool comprising:
   a mould tool component comprising:
      a thermal transmission face;
      a temperature control face opposite the thermal transmission face and a plurality of sidewalls extending from the temperature control face defining a plurality of individual fluid chambers adjacent the temperature control face; and
      a fluid based temperature control apparatus associated with at least some of the plurality of fluid chambers, each temperature control apparatus being configured to produce a fluid jet directed to a respective impingement region on the temperature control face;
   wherein at least some of the plurality of fluid chambers of the mould tool component define at least one rib extending into the respective fluid chamber from the temperature control face and extending from the impingement region on the temperature control face towards at least one of the plurality of sidewalls, and
   wherein at least one rib has a concave and arched profile in a cross section extending away from the temperature control face.

2. A mould tool according to claim 1, wherein in at least some of the plurality of fluid chambers, three or more ribs extend radially at different angles from the impingement region towards the respective sidewalls defining the chamber.

3. A mould tool according to claim 1, wherein the arched profile comprises a 90 degree arch from the impingement region to the sidewall.

4. A mould tool according to claim 2, wherein the three or more ribs are distributed symmetrically about at least one plane normal to the temperature control face and intersecting the impingement region.

5. A mould tool according to claim 1, wherein the plurality of sidewalls terminate in a planar seal face that is spaced apart from the temperature control face, and wherein the at least one rib is contained within the fluid chamber defined by the temperature control face, side wall and the plane of the planar seal face.

6. A mould tool according to claim 5, wherein the at least one rib terminates at the plane of the planar seal face.

7. A mould tool according to claim 1, further comprising:
a mould tool support configured to support the mould tool component during moulding, wherein a load path from the thermal transmission face to the support component is through the at least one rib.

8. A mould tool according to claim 7, wherein the at least one rib contacts the mould tool support.

9. A mould tool according to claim 1, wherein the fluid based temperature control apparatus comprises a fluid outlet in contact with the at least one rib.

10. A mould tool according to claim 9, comprising a plurality of ribs equally spaced around the fluid outlet.

11. A mould tool according to claim 2, wherein the at least one rib has an arched profile in cross section.

12. A mould tool according to claim 11, wherein the at least one rib has a curved, arched profile in cross section.

13. A mould tool according to claim 1, wherein in at least some of the plurality of fluid chambers, two or more arched, concave ribs extend radially from the impingement region towards the respective sidewall defining the chamber.

14. A mould tool comprising:
a mould tool component comprising:
a thermal transmission face;
a temperature control face opposite the thermal transmission face and a plurality of sidewalls extending from the temperature control face defining a plurality of individual fluid chambers adjacent the temperature control face; and
a fluid based temperature control apparatus associated with at least some of the plurality of fluid chambers, each temperature control apparatus being configured to produce a fluid jet directed to a respective impingement region on the temperature control face;
wherein at least some of the plurality of fluid chambers of the mould tool component define a plurality of ribs extending into the respective fluid chamber from the temperature control face and extending from the impingement region on the temperature control face towards at least one of the plurality of sidewalls, and
wherein each rib of the plurality of ribs has a concave profile in a cross sectional plane and wherein in at least some of the plurality of fluid chambers, three or more ribs of the plurality of ribs extend radially at different angles from the impingement region towards the respective sidewalls defining the chamber.

* * * * *